United States Patent
Brahmbhatt et al.

(10) Patent No.: US 7,739,390 B2
(45) Date of Patent: Jun. 15, 2010

(54) METHOD AND APPARATUS FOR ACHIEVING OPTIMAL TRANSFER TIMES IN A PEER-TO-PEER NETWORK

(75) Inventors: Deepali Apurva Brahmbhatt, Mountain View, CA (US); Bryan Turner, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1205 days.

(21) Appl. No.: 11/088,622

(22) Filed: Mar. 23, 2005

(65) Prior Publication Data

US 2006/0218222 A1  Sep. 28, 2006

(51) Int. Cl.
G06F 15/16 (2006.01)

(52) U.S. Cl. .................... 709/227; 709/228; 709/229
(58) Field of Classification Search .......... 709/227, 709/228, 229
See application file for complete search history.

(56) References Cited

U.S. PATENT DOCUMENTS 7,343,418 B2 * 3/2008 Herley ................... 709/229

2007/0174471 A1 * 7/2007 Van Rossum ............ 709/229

OTHER PUBLICATIONS

Su, Xiao et al., "Scalable Coded Image Transmissions Over Peer-To-Peer Networks", Proc. IEEE International Conference on Mulitmedia and Expo., pp. 493-496, Jul. 2003.

* cited by examiner

*Primary Examiner*—Vivek Srivastava
*Assistant Examiner*—Adnan Mirza
(74) *Attorney, Agent, or Firm*—Patterson & Sheridan, LLP (57) ABSTRACT

Apparatus and methods are disclosed for optimizing the transfer time of files in a peer-to-peer network. In disclosed embodiments, a requesting peer desires to transfer a file from a group of supplying peers creates a list of segments available of the file to be transferred available from each of the supplying peers, and orders the list in order of increasing segment size available. The supplying peers are then grouped based on available segments. Then, beginning with the group of supplying peers having the largest portion of the file to be transferred, the requesting peer assigning segments to transfer and a corresponding transfer time to each of the members of the group of supplying peers. The requesting peer then transfers in parallel the assigned segments from the group of supplying peers.

16 Claims, 9 Drawing Sheets

METHOD AND APPARATUS FOR ACHIEVING OPTIMAL TRANSFER TIMES IN A PEER-TO-PEER NETWORK

BACKGROUND

1. Field of the Disclosure

The disclosure relates generally to data transfer, and in particular, to optimizing transfer times in a peer-to-peer network.

2. The Prior Art

One common use of the Internet since its inception is transferring and downloading files. The most common method by which files are transferred on the Internet is the client-server model. A central server sends the entire file to each client that requests it—this is how both http and ftp operate. The clients only speak to the server, and never to each other.

The main advantage of the client-server model is its simplicity—a user logs into to a server and initiates the download process. Additionally, files are usually available for long periods of time as the servers tend to be dedicated to the task of serving, and are always on and connected to the Internet.

However, the client-server model has a significant problems with files that are large or very popular, or both, such as newly released content. In particular, a great deal of bandwidth and server resources must be dedicated to distributing each file, since the server must transmit the entire file to each client. The concept of server mirrors partially addresses this shortcoming by distributing the load across multiple servers, however coordination between sites and much effort is required to set up an efficient network of mirrors. Hence, mirroring is typically feasible only for the busiest of sites.

Another method of transferring files has become popular recently: the peer-to-peer network (P2P), including systems such as Kazaa, eDonkey, Gnutella, Direct Connect, etc. In a typical peer-to-peer network, Internet users trade files by directly connecting to each other, i.e., on a one-to-one basis. Files may then be shared without having to access a central server. Because of the anonymity of this process, there is little accountability regarding the copyright protection of the files, and hence these networks tend to be very popular for the transfer of illicit files such as music, movies, pirated software, etc.

Typically, a downloader receives a file from a single peer source, however newer versions of some clients allow downloading a single file from multiple sources to achieve higher speeds. The problem discussed above of popular downloads is somewhat mitigated, because there's a greater chance that a popular file will be offered by a number of peers. The breadth of files available tends to be fairly wide, though download speeds for obscure files tend to be lower.

Another common problem associated with peer-to-peer systems is the significant protocol overhead for passing search queries amongst the peers, and the number of peers that one can reach is often limited as a result. Partially downloaded files are usually not available to other peers, although some newer clients may offer this functionality. Availability is generally dependent on the goodwill of the users, to the extent that some of these networks have tried to enforce rules or restrictions regarding send/receive ratios.

Usenet binary newsgroups represent yet another method of file distribution that is substantially different from the other methods. Files transferred over Usenet are often subject to miniscule windows of opportunity. Typical retention time of binary news servers are often as low as 24 hours, and having a posted file available for a week is considered a long time. However, the Usenet model is relatively efficient, in that the messages are passed around a large web of peers from one news server to another, and finally fanned out to the end user from there. Often the end user connects to a server provided by his or her ISP, resulting in further bandwidth savings.

Usenet is also one of the more anonymous forms of file sharing, and thus too often is used for illicit files of almost any nature. Due to the nature of NNTP (Network News Transfer Protocol), a file's popularity has little to do with its availability and hence downloads from Usenet tend to be quite fast regardless of content. The downside of this method include a extravagant set of rules and procedures, and thus efficient downloading requires a certain amount of effort and understanding from the user. Patience is often required to get a complete file due to the nature of splitting large files into a number of smaller segments. Finally, access to Usenet often must be purchased due to the extremely high volume of messages in the binary groups.

BitTorrent is a newer protocol designed for transferring files in a peer-to-peer fashion. In BitTorrent, users connect directly to each other to send and receive portions of the file. However, there is a central server (called a tracker) which coordinates the action of all such peers. The tracker only manages connections and does not have any knowledge of the contents of the files being distributed, and therefore a large number of users can be supported with relatively limited tracker bandwidth. The key philosophy of BitTorrent is that users should upload (transmit outbound) at the same time they are downloading (receiving inbound). In this manner, network bandwidth is utilized as efficiently as possible. BitTorrent is designed to work better as the number of people interested in a particular file increases, in contrast to other file transfer protocols where more users tend to bog the system down.

One type of file that is becoming more common is referred to a progressive resolution files that have lower resolution files embedded within higher resolution files. Such a files are also referred to coded image files. JPEG2000 is an example of such a file in which a lower resolution versions of the same file provides a complete image, just at a lower resolution when compared to the corresponding full-version image file.

Thus, in a P2P network having a progressive image file, some peers will have lower resolution pieces and some will have higher resolution pieces that correspond to the same image file. A challenge therefore exists to determine the optimal transfer pattern when performing a parallel file transfer from a give set of peers that have differing pieces of a desired file.

The BitTirrent protocol breaks files into blocks and attempts to find peers that together contain all of the blocks of a file desired by a peer. In BitTorrent, a 'seed' is a peer that contains a full version of a particular file. Peers, known as 'leeches', request a file and begin to download pieces of the file. As more leeches request the file, the leeches begin to 'swarm' and share various pieces of the file amongst other peers. Bittorrent demands that leeches share the pieces they have downloaded with other peers rather than the seed providing pieces that already exist in the swarm. Thus, BitTorrent forces a swarm of peers to share amongst themselves whenever possible, thus balancing the bandwidth across the swarm. As long as there is one seed with a complete version of the file, all leeches will eventually acquire a full version of the file.

However, as the emphasis of BitTorrent is on bandwidth sharing, there is little emphasis on optimizing the transfer time of files. Rather, BitTorrent aims to saturate a given link through a series of heuristics and rotating transfer attempts.

Some effort has been made in the prior art to examine the consequences of transferring progressive image file files in a P2P scenario. One such example that examines the consequences of a shrinking pool of peers as those peers with smaller versions of a coded file drop out of the peer supply pool is found in X. Su and R. Fatoohi, "Scalable Coded Image Transmissions over Peer-to-Peer Networks," *Proc. IEEE International Conference on Multimedia and Expo*, pp. 493-496, July, 2003.

However, such algorithms tend to either download available pieces from the fastest source first, or from an optimized list of sources ordered from peers having the beginning of the file to peers having the end of the file. However, such algorithms will tend to provide the end piece of the file last, as this is the piece that generally is the least available.

Hence, there is a need for a parallel file transfer algorithm that achieves optimal transfer time in given domain.

DETAILED DESCRIPTION

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein.

Accordingly, the representation of various aspects of the present disclosure through the use of flowcharts should not be used to limit the scope of the present disclosure.

The present disclosure may be used in content distribution system where a device on the edge that requires only a piece of a given file. In such a system, the peers may comprise network devices such as routers or data switches that desire a particular file that exist on their peers.

The present disclosure provides an efficient algorithm to obtain the file (or a desired piece of the file) in the fastest manner possible by examining the size of file segments present on each peer, and then determining the optimum transfer algorithm amongst the peers before transfer begins.

The algorithm of this disclosure examines a pool of peers containing various pieces of a desired file. The algorithm then divides the peers into groups containing various pieces or segments of the file. The groups are ordered in the reverse of the ordering found in the prior art, i.e., the groups are ordered from those containing the end of the file (i.e., those peers having a complete version of a progressive file) to those groups containing lesser resolutions of the file (i.e., smaller segments of the file).

Figure 1:
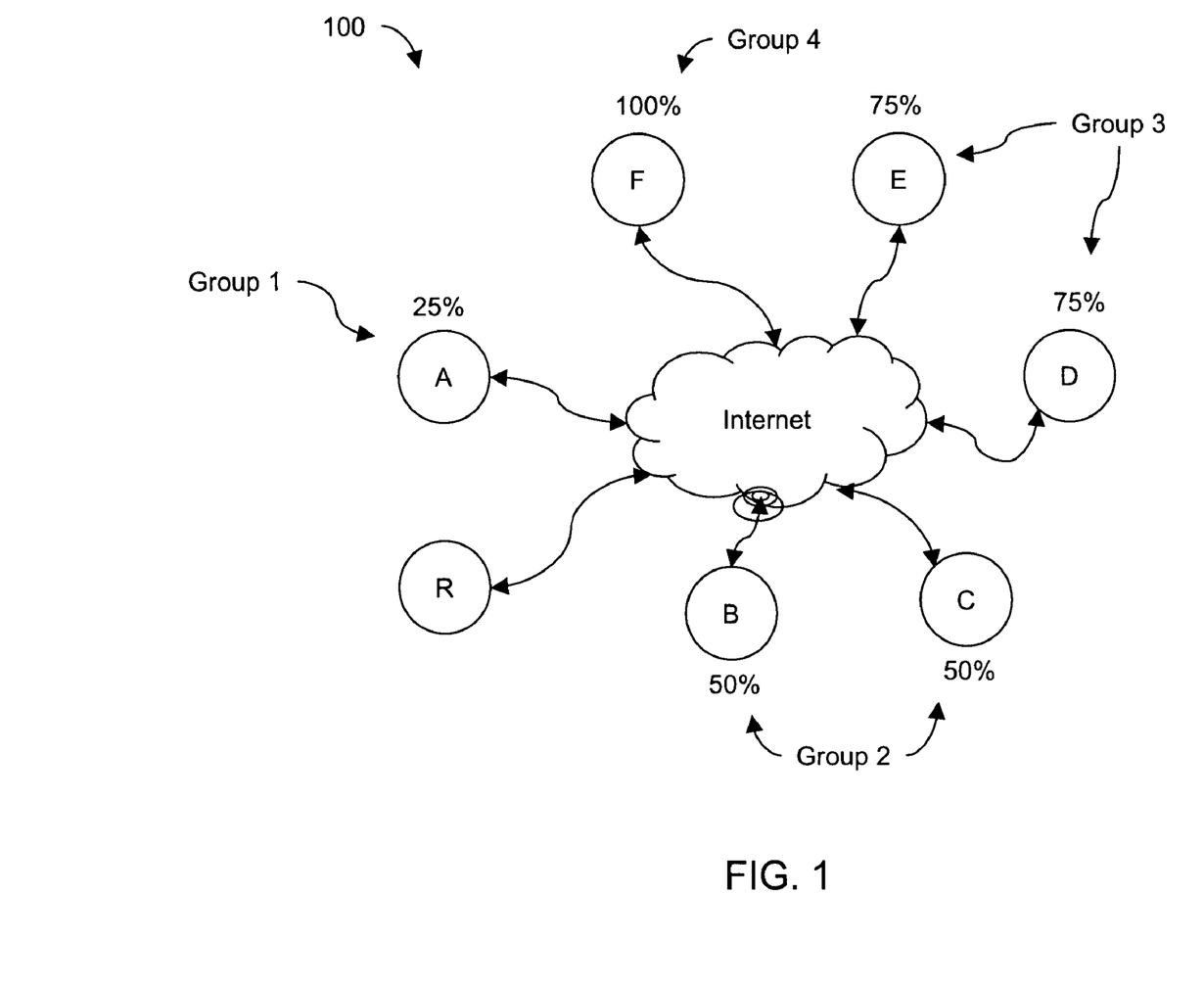
FIG. 1 is a conceptual block diagram of a requesting peer and a pool of supplying peers A-F coupled through the Internet-enabled in accordance with this disclosure.

FIG. 1 is a diagram showing a group of peers 100 labeled A-F coupled to each other through the Internet. A requesting peer R is also coupled to the Internet and is seeking a particular file. It is contemplated that the desired file may comprise a progressive or coded file as discussed above. Additionally, it contemplated that the peers A-F and R are members of a pool compliant with a P2P protocol that enables parallel file sharing such as BitTorrent. It is contemplated that the teachings of this disclosure may be embodied as a modification of such protocols. Additionally, it is contemplated that any requisite handshake process may be initiated by the requesting peer, and handled by either each of the supplying peers in turn. Alternatively, the handshake process may be performed by a central server or tracker.

It is further contemplated that the requesting peer of this disclosure may comprise conventional PC that is configured to run software embodiments of this disclosure. Such a PC may function as an edge device that is desiring to download multimedia clips which can be streamed (i.e. downloaded and played simultaneously), e.g., audio or video clips.

The process of this disclosure begins with a handshake process in which the requesting peer R requests a file that is stored amongst the peers. As mentioned above, the files may be distributed amongst the peers in differing sizes. FIG. 1 shows that peer A has 25% of the files stored, peers B and C each have 50%, peers D and E each have 75%, and peer F has a complete 100% copy.

The algorithm them divides the pool of peers into groups having corresponding amounts of the desired file. In FIG. 1, this results in four groups: Group 1 including just peer A; Group 2 including peers B and C; Group 3 including peers D and E; and Group 4 including peer F.

The algorithm then begins to assign peer assignments for downloading particular file segments from the peers.

FIG. 2A-2E show the process of peer assignment in accordance with the teaching of this disclosure. FIGS. 2A-2E shows the peer pool ordered by the segments 1-4 of the desired file stored on each of the constituent peers.

Figure 2A:
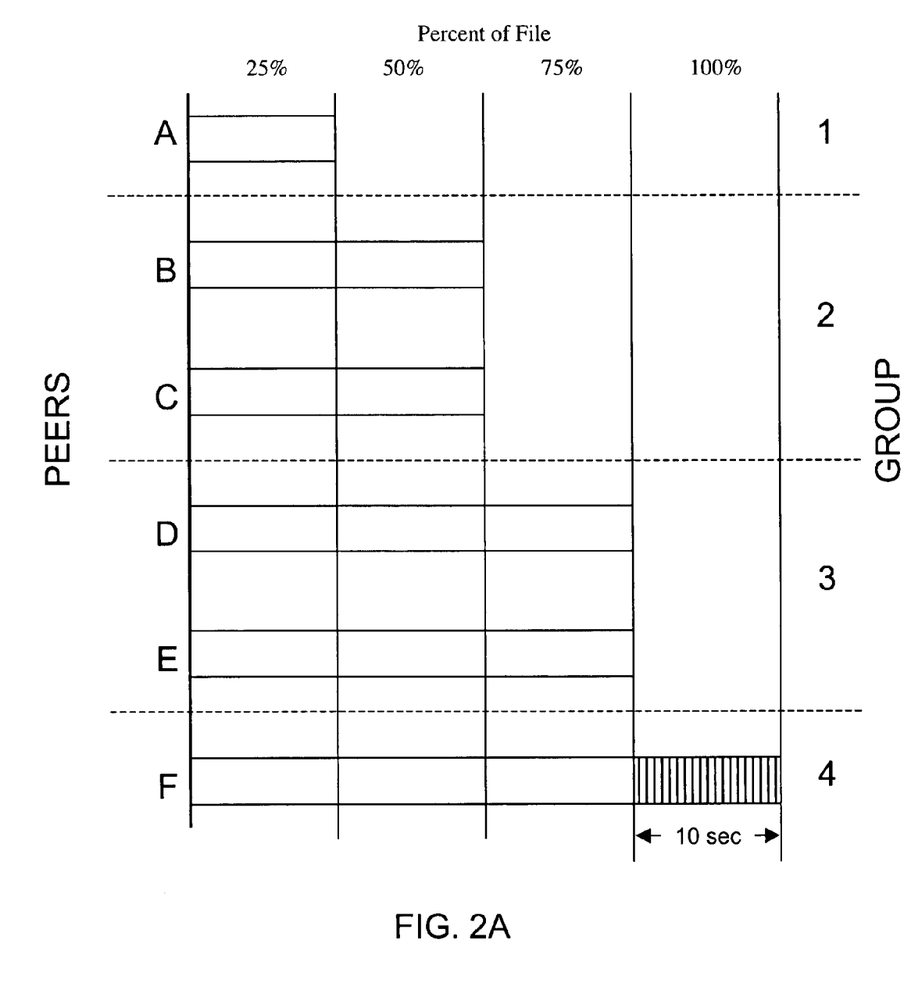
FIGS. 2A-E are diagrams of segment assigning for transfer in accordance with this disclosure.
Figure 2B:
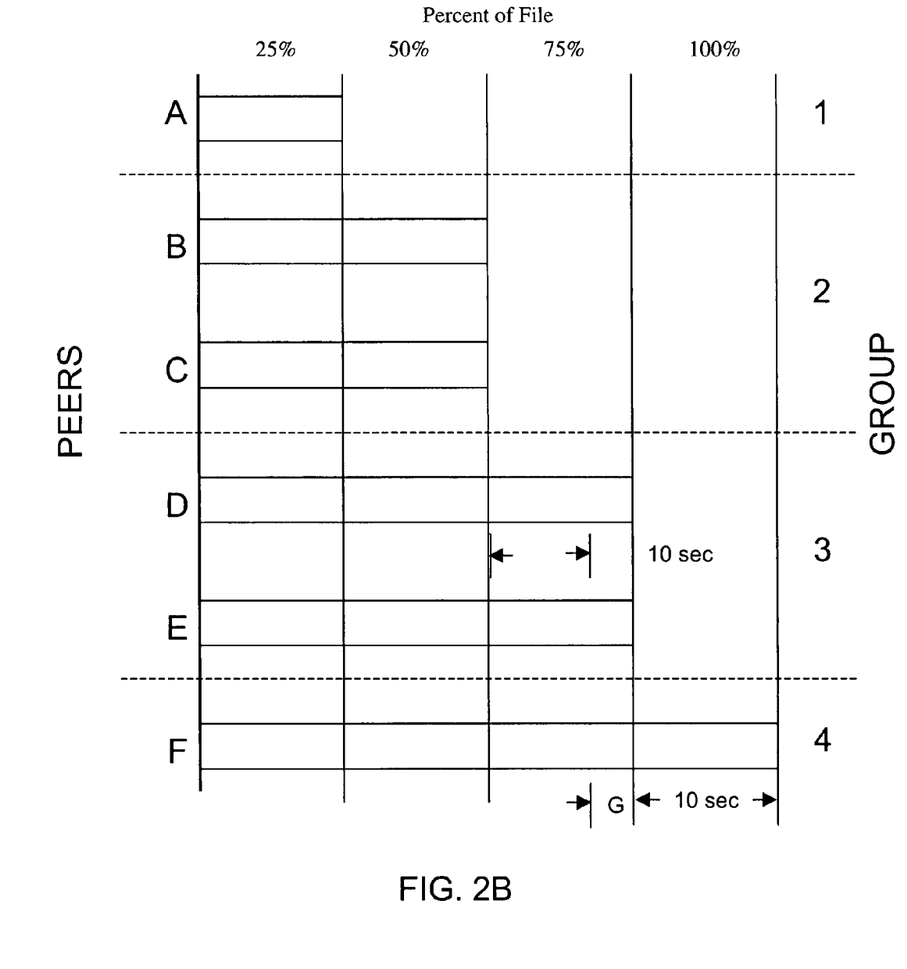

The algorithm begins in FIG. 2A, where the assignment process begin by assigning the transfer of the end of the file, segment 4. As only peer F has segment 4, peer F will be assigned to transfer the segment 4. In addition to assigning the size of the transfer from peer F, the present algorithm will also calculate how long this transfer will take using the bandwidth estimate received during the handshake. Let's assume it will take 10 sec to transfer the segment 4 of the file from peer F, as shown in FIG. 2A with horizontal hashing.

Figure 2C:
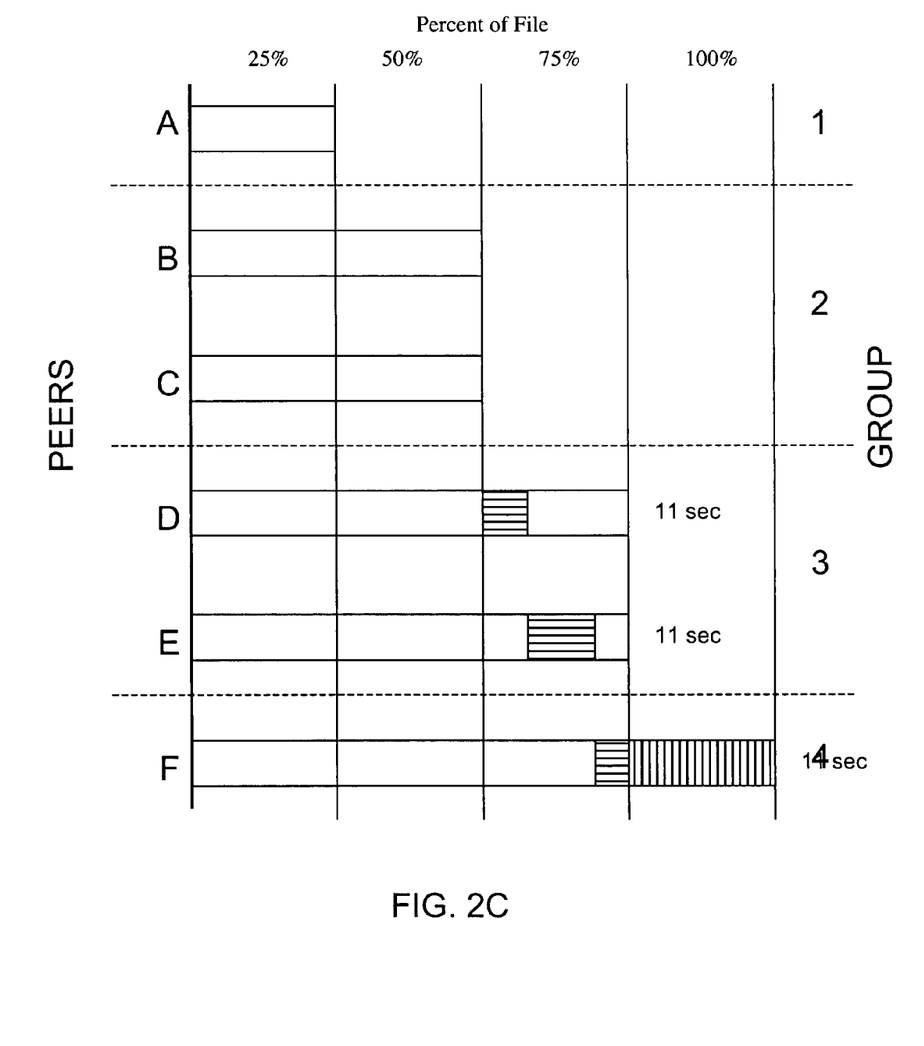

The algorithm then determines how much of the next segment, segment 3, can be downloaded from the next group (peers D and E). Let's assume that in 10 seconds, peers D and E will not completely upload their segment, resulting in a gap G of segment 3. The present algorithm will then place peer F back into the pool to obtain the missing part of segment 3. FIG. 2C shows that peers F, E, and D now have assignments for 11 seconds each to transfer segment 4 (with vertical hashing) from peer F, and segment 3 (with horizontal hashing) from peers D, E, and F.

It will be appreciated that supplying peers may have differing upload speeds within the same group. The present algorithm takes this into account and may assign a faster peer to upload more of a particular segment to optimize the overall transfer speed. For example if peer B has a much higher upload bandwidth than peer C, we may expect peer B to upload a correspondingly greater amount of segment 2, even though peers B and C are in the same segment group.

Figure 2D:
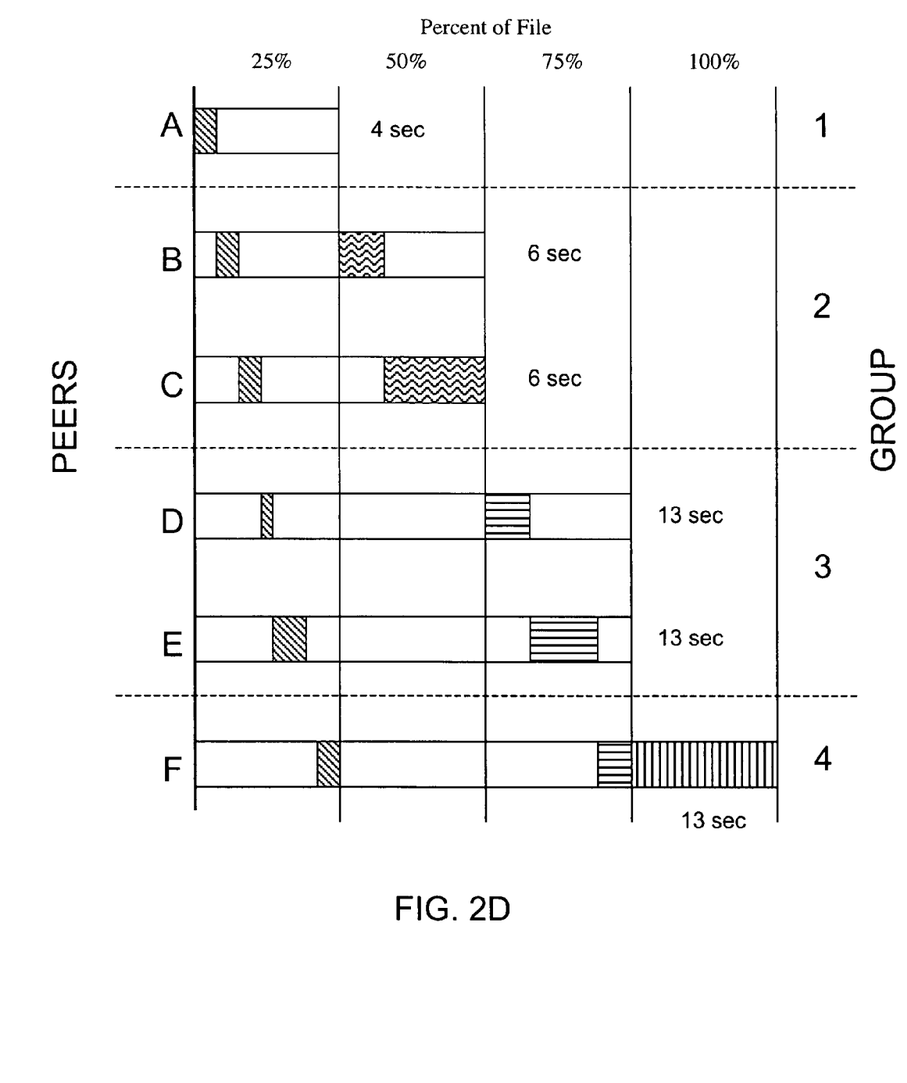

FIG. 2D show this with the assignment algorithm having assigned transfer time across all peers. FIG. 2D shows that segment 2 (zig-zag hashing) has been transferred primarily from the faster peer C, and segment 1 (diagonal hashing) across all has been assigned across all peers.

Note that the total transfer time for peer F, the peer with the total file, is in line with many other peers. This eliminates the problem of the prior art where the peer having the largest share of the file typically has a transfer time disproportionately larger than other peers, resulting in waiting for the final peer to transfer their assignment when the other peers are finished.

Figure 2E:
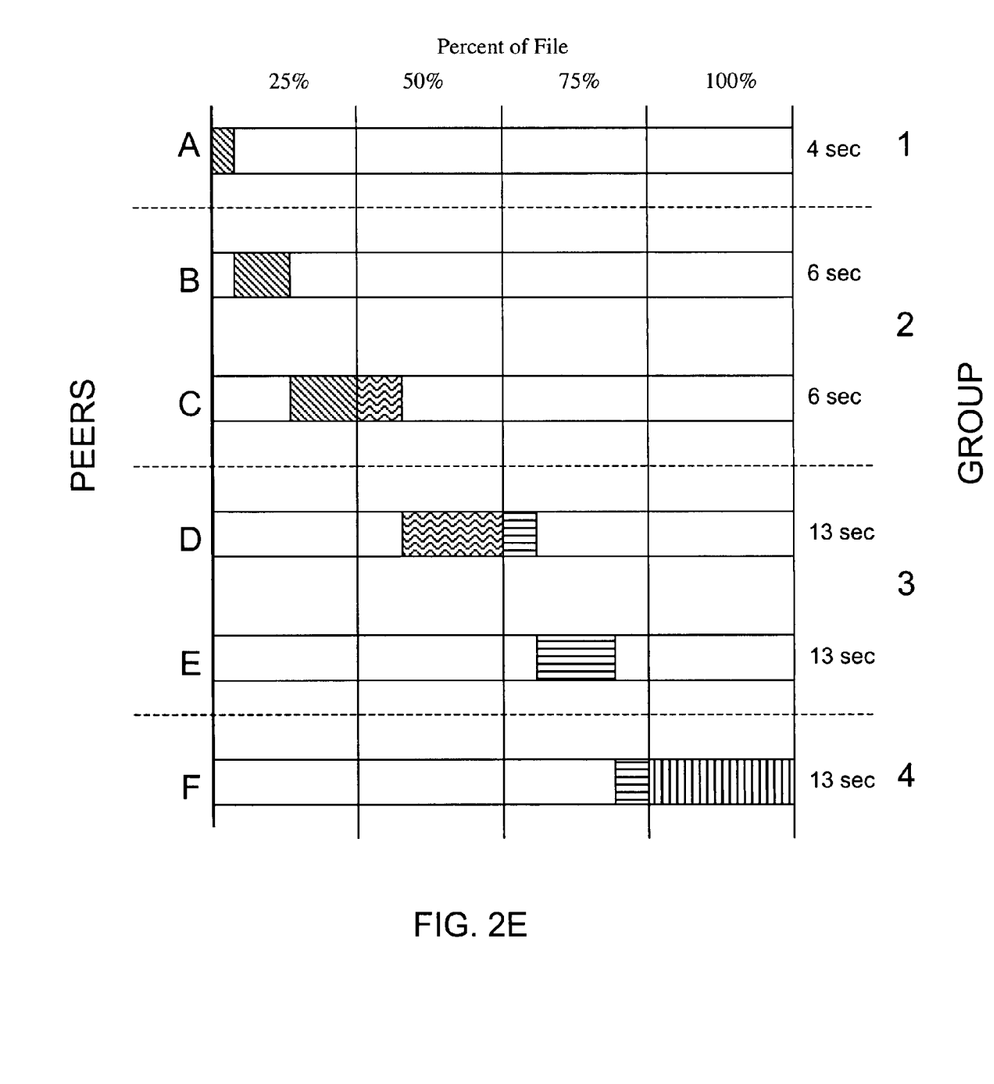

The algorithm of the present disclosure may also further optimize the process by assigning contiguous ranges of segments to be transferred. Unlike the prior art, which typically breaks up the transfers into various small blocks randomly selected throughout the file, the present algorithm may arrange the downloads to be sourced from contiguous ranges of the file. This improves the load on the peer, as they can just read contiguous blocks off the disk. The final output of the algorithm may then comprise a list of begin/length pairs for each peer's assigned region as shown in FIG. 2E.

Figure 3:
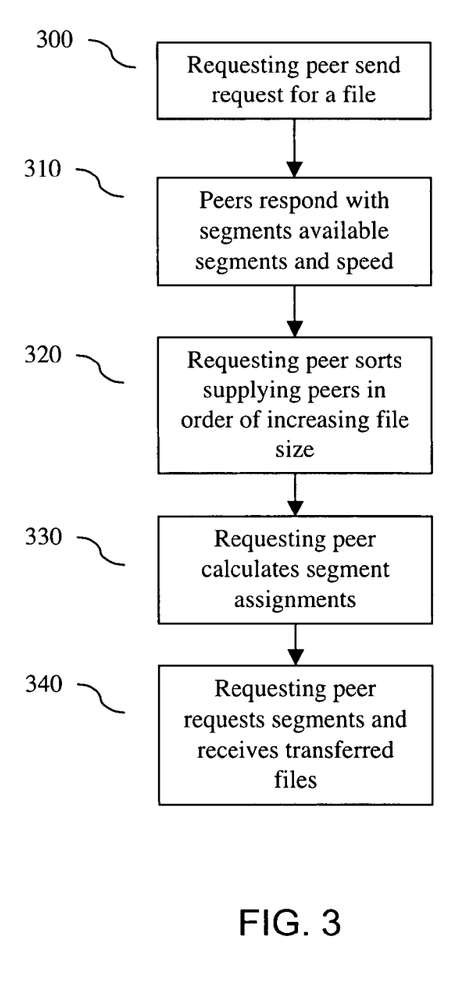
FIG. 3 is a flow diagram of a method for optimizing file transfer times in accordance with this disclosure.

FIG. 3 is flow diagram of a method for optimizing transfer times in a peer-to-peer network in accordance with this disclosure. The process of FIG. 3 begins in act 300, where a requesting peer sends a request for a file to pool of peers. In act 310, the pool of peers responds to the request with their segment availability and upload bandwidth.

In act 320, the requesting peer takes the responses from the pool of peers and sorts the responses in increasing order of file size. The requesting peer then calculates the segment assignments in act 330. Finally, in act 340, the requesting segment requests segments from each of the supplying peers in accordance with the assignments and re-assembles the received segments to form the requested file when the transfer is complete.

Figure 4:
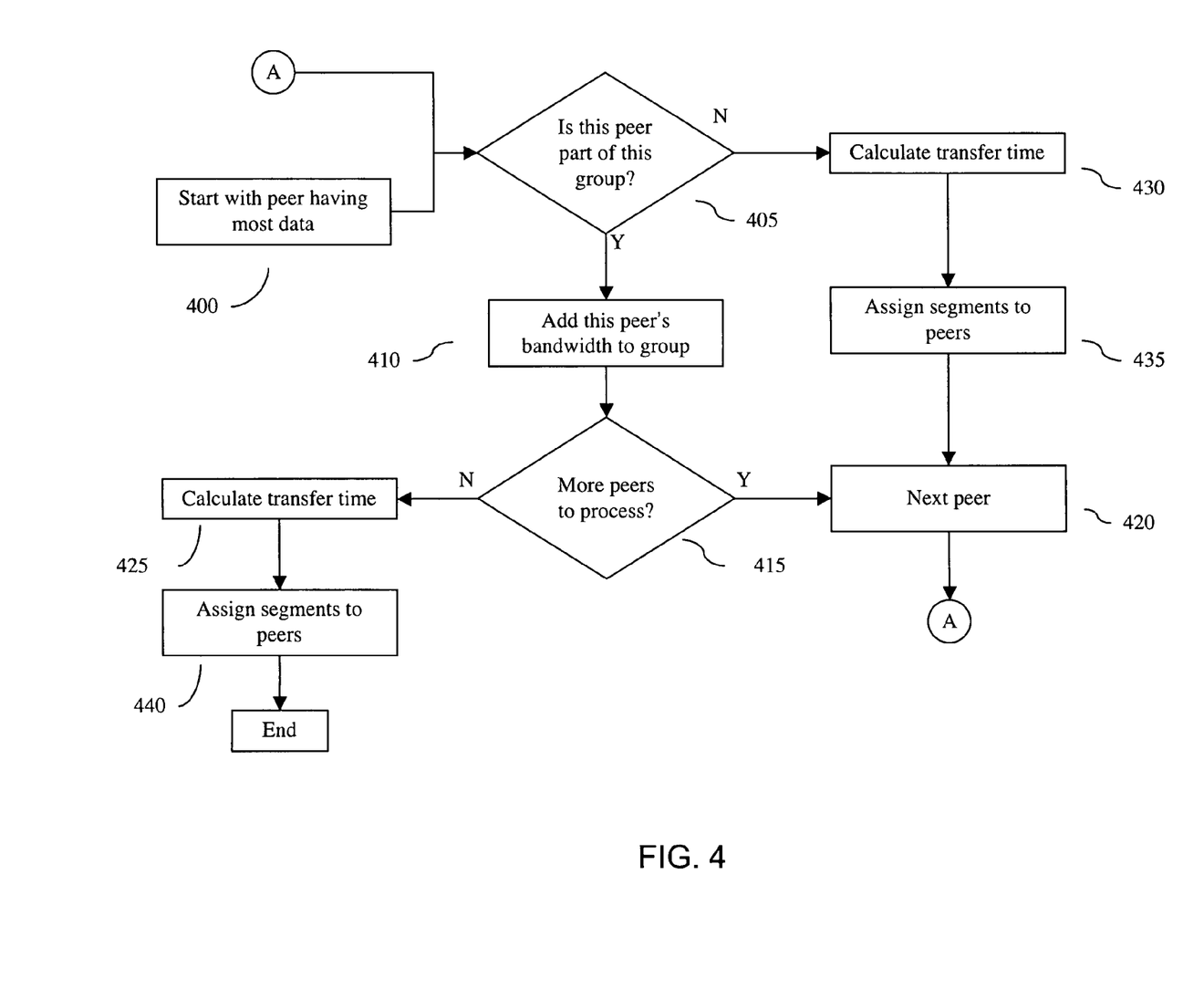
FIG. 4 is a flow diagram of a further method for optimizing file transfer times in accordance with this disclosure.

FIG. 4 is a more detail flow diagram of a method for calculating the optimal file transfer time in accordance with this disclosure. In the process of FIG. 4, the peers are placed into groups simultaneously with the file transfer time being calculated, resulting in quicker processing times than prior art methods.

It is contemplated that the disclosed processes may utilize two pieces of information in calculating transfer times and segment assignments. First, an ordered list is created containing the pool of available peers and their respective available segments. This list is preferably sorted in order of increasing available file size. Second, a stack is created that contains links to groups of peers, and the transfer time to be assigned to each group. The current group as referred to herein as the group on top of the stack. The process then cycles through once, working through the list of peers, assigning the peers into groups while simultaneously calculating transfer times.

The process begins in act 400, where the peer having the most complete version of a file to be transferred being operated on first. The process then moves to query 405, where it is determined whether the current peer being examined is part of the current group being assigned in the stack. In a preferred embodiment, the segment size of the current peer is compared with the current segment size on top of the stack to make this determination.

If it determined that the current peer is indeed part of the current group, then the process moves to act 410, where the current peer's bandwidth is added to the current group on top of the stack. The process then moves to query 415, where it is determined whether there are more peers to process. If there are more peers to process, then the process moves to act 420, where the next peer in the list becomes the current peer, and the process moves back to query 405 through bubble A.

As will be appreciated, peers having the same segment size as the segment size of the current group of peers on top of the stack will have their bandwidth contributed to the current group as a result of the disclosed process.

Eventually, the process will encounter a peer that does not have the same segment size as the current group, and thus is a member of a different group. Thus, query 405 will result in a negative determination, and the process will move to act 430 where the transfer times are calculated. Preferred method for calculating transfer time will be more fully disclosed below.

Once the transfer times have been calculated in act 425, the process moves to act 435, where segments assignments are assigned to the group. The process then moves to act 420, where the next peer is examined. As this new peer has a different segment from the current group, this peer is used to define a new group and is pushed on top of the stack.

The process of FIG. 4 will continue until all peers in the list have been assigned into groups. Query 415 will then result in a negative determination, and the process will move to act 425, where the transfer time will be calculated one last time. The process then moves to act 440, where segments to be transferred are assigned to the supplying peers. In a preferred embodiment, the segments to transfer as stored in the stack are assigned to the constituent peers in each group. The process then ends.

Figure 5:
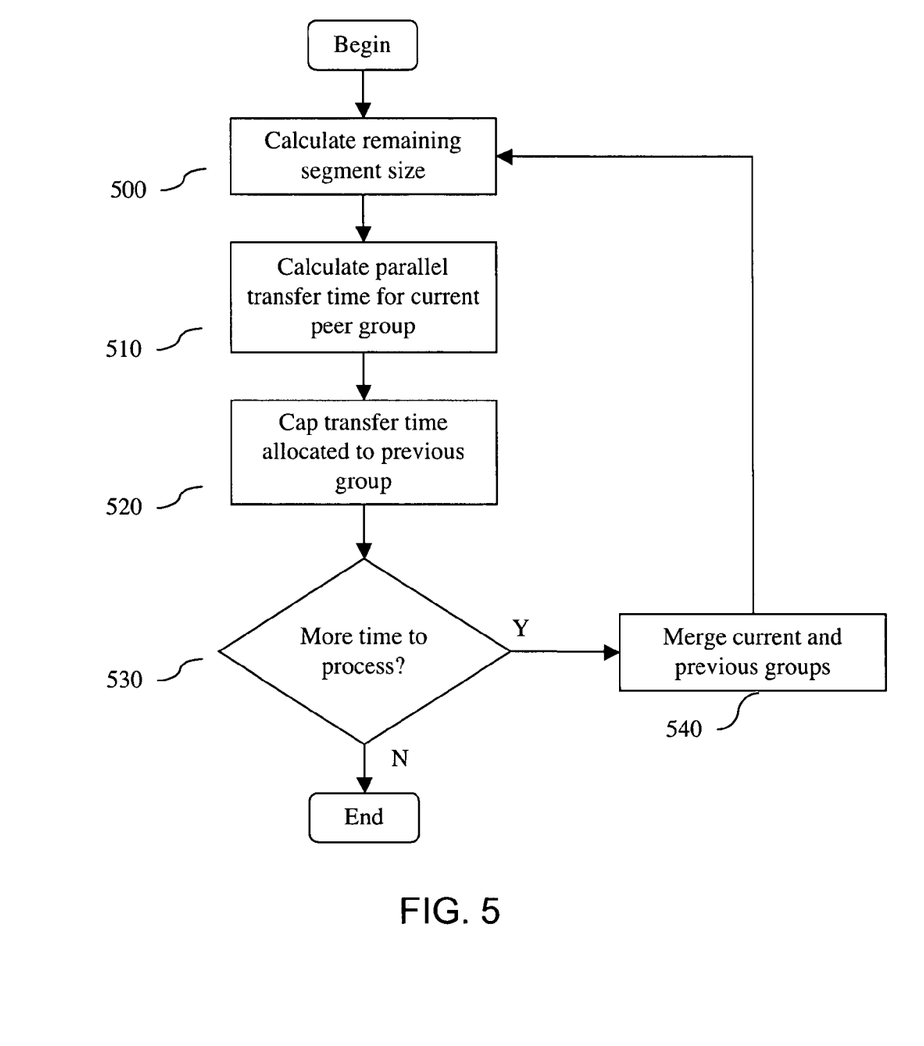
FIG. 5 is a flow diagram of a method for calculating file transfer times in accordance with this disclosure.

FIG. 5 is a flow diagram of a method for calculating transfer times in accordance with the teachings of this disclosure. The process begins in act 500, where the remaining segment size is calculated. The parallel transfer time for the current group is then calculated in act 510. In a preferred embodiment, the parallel transfer time is calculated for the peer group that is on top of the stack in act 510.

The process then moves to act 520, where the transfer time already allocated to the current peer group is capped, representing the next-down's assigned value. In query 530, it is determined if there is more time remaining to calculate. In a preferred embodiment, the determination in query 530 may be made by determining whether the time allocated to the stack top time is equal to the time allocated to the next-from-top peer group. If there is more time to process, the process moves to act 540, where the current and previous groups are merged, and the process loops back to act 500. In a preferred embodiment, the time allocated to the current peer group is merged with the time allocated to the next-from-the-top peer group. If there is no more time to process, then the process of FIG. 5 ends.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. An apparatus for optimizing the transfer time of files in a peer-to-peer network, comprising:
   a requesting peer that desires to transfer a file from a group of supplying peers;
   the requesting peer being configured to:
      create a list of segments available of the file to be transferred from each of the supplying peers;
      order the list in order of increasing segment size available;
      group the supplying peer group into groups based on available segments;
      assign segments of the file to transfer and a corresponding transfer time to each of the members of the group of supplying peers, where the assigning comprises:
         beginning with the group of supplying peers having the largest portion of the file to be transferred, assigning transfer of the end of the file:
         assigning a next segment by determining how much of the next segment can be downloaded from the group of supplying peers;
         if an assignment would result in a gap, placing members of the group of supplying peers with a larger segment size back into the pool of available peers; and
         continuing the assigning until all segments have been assigned; and transfer in parallel the assigned segments from the group of supplying peers to the requesting peer.

2. The apparatus of claim 1, wherein the requesting peer is configured to simultaneously assign segments of the file to transfer and the corresponding transfer time.

3. The apparatus of claim 2, wherein the requesting peer is further configured to order by upload speed within each of the groups prior to the act of assigning segments and corresponding transfer times.

4. The apparatus of claim 3, where the requesting peer is further configured to assign supplying peers continuous segments to transfer.

5. A peer in a peer-to-peer network, comprising:
   means for requesting a file to be transferred from a group of supplying peers;
   means for creating a list of segments available from each of said supplying peers, said list of available segments from said file to be transferred;
   means for ordering said list in order of increasing segment size available;
   means for grouping said supplying peer group into groups based on said available segments;
   means for assigning segments to transfer and a corresponding transfer time to each of said members of said group of supplying peers beginning with the group of supplying peers having the largest portion of said file to be transferred;
   means for transferring in parallel the assigned segments from said group of supplying peers to said peer; and
   means for adding the group of supplying peers having the largest amount of available segments back into the pool of available peers when assigning segments and corresponding transfer times for subsequent groups.

6. The peer of claim 5, wherein the means for assigning segments to transfer and a corresponding transfer time comprises means for simultaneously assigning said segments to transfer and said corresponding transfer time.

7. The peer of claim 6, further comprising means for ordering supplying peers by upload speed within each of said groups prior to said act of assigning segments and corresponding transfer times.

8. The peer of claim 7, further comprising means for assigning supplying peers continuous segments to transfer.

9. A computer-readable device including instructions for performing a method for optimizing the transfer time of files in a peer-to-peer network, the method comprising:
   requesting, by a requesting peer, a file to be transferred from a group of supplying peers;
   creating, by said requesting peer, a list of segments available from each of said supplying peers, said list of available segments from said file to be transferred;
   ordering said list in order of increasing segment size available;
   grouping said supplying peer group into groups based on said available segments;
   beginning with the group of supplying peers having the largest portion of said file to be transferred, assigning segments to transfer and a corresponding transfer time to each of said members of said group of supplying peers, wherein said act of assigning segments further comprises adding the group of supplying peers having the largest amount of available segments back into the pool of available peers when assigning segments and corresponding transfer times for subsequent groups; and
   transferring in parallel the assigned segments from said group of supplying peers to said requesting peer.

10. The device of claim 9, wherein said acts of assigning segments to transfer and assigning a corresponding transfer time are performed simultaneously.

11. The device of claim 10, wherein said supplying peers are ordered by upload speed within each of said groups prior to said act of assigning segments and corresponding transfer times.

12. A method, comprising:
   requesting a file on a peer-to-peer network from a plurality of supplying peers on the peer-to-peer network;
   grouping the plurality of supplying peers into a plurality of availability groups based, at least in part, on segments of the file that are available from the plurality of supplying peers, where an availability group comprises one or more supplying peers from the plurality of supplying peers with the same segments of the file;
   requesting from supplying peers in a first availability group of the plurality of availability groups a first portion of the file, where the first availability group comprises one or more supplying peers having available more segments of the file than supplying peers of subsequent availability groups; and
   requesting subsequent portions of the file from subsequent availability groups, where the subsequent availability groups have available fewer segments of the file than previous groups;
   where requesting a portion of the file comprises requesting different segments of the portion of the file from different supplying peers of an availability group based, at least in part, on transfer times and bandwidths of supplying peers of the availability group.

13. The method of claim 12, where when requesting a subsequent portion of the file from a subsequent group previous groups are combined with the subsequent group and segments of the subsequent portion of the file are apportioned between supplying peers of the subsequent group and supplying peers of the previous groups.

14. The method of claim 12, further comprising:
  receiving in parallel the different segments of the portion of the file.

15. The method of claim 12, where requesting segments from a supplying peer comprises requesting continuous segments from the supplying peer.

16. The method of claim 12, where the peer-to-peer network utilizes a bit torrent protocol.

* * * * *